United States Patent
Sistla

(10) Patent No.: US 7,827,357 B2
(45) Date of Patent: Nov. 2, 2010

(54) PROVIDING AN INCLUSIVE SHARED CACHE AMONG MULTIPLE CORE-CACHE CLUSTERS

(75) Inventor: Krishnakanth Sistla, Beaverton, OR (US)

(73) Assignee: Intel Corporation, Santa Clara, CA (US)

( * ) Notice: Subject to any disclaimer, the term of this patent is extended or adjusted under 35 U.S.C. 154(b) by 444 days.

(21) Appl. No.: 11/888,018

(22) Filed: Jul. 31, 2007

(65) Prior Publication Data

US 2009/0037658 A1 Feb. 5, 2009

(51) Int. Cl.
*G06F 12/00* (2006.01)
(52) U.S. Cl. ............... 711/130; 711/119; 711/141; 711/144
(58) Field of Classification Search .......... 711/119, 711/124, 130, 141, 144, 146, E12.038
See application file for complete search history.

(56) References Cited

U.S. PATENT DOCUMENTS

| | | | |
|---|---|---|---|
| 6,009,488 A | 12/1999 | Kavipurapu | 710/105 |
| 6,801,984 B2 * | 10/2004 | Arimilli et al. | 711/146 |
| 6,854,045 B2 | 2/2005 | Ooi et al. | 711/202 |
| 2007/0005909 A1 | 1/2007 | Cai et al. | 711/146 |

OTHER PUBLICATIONS

U.S. Appl. No. 11/526,431, filed Sep. 25, 2006, entitled, "Adaptively Reducing Memory Latency In A System," by Krishnakanth Sistla.
U.S. Appl. No. 11/606,347, filed Nov. 29, 2006, entitled "Conflict Detection And Resolution In A Multi Core-Cache Domain For A Chip Multi-Processor Employing Scalability Agent Architecture," by Krishnakanth Sistla.
U.S. Appl. No. 11/605,636, filed Nov. 29, 2006, entitled "System And Method For Aggregating Core-Cache Clusters In Order To Produce Multi-Core Processors," by Krishnakanth Sistla.

* cited by examiner

*Primary Examiner*—Jasmine Song
(74) *Attorney, Agent, or Firm*—Trop, Pruner & Hu, P.C.

(57) ABSTRACT

In one embodiment, the present invention includes a method for receiving requested data from a system interconnect interface in a first scalability agent of a multi-core processor including a plurality of core-cache clusters, storing the requested data in a line of a local cache of a first core-cache cluster including a requester core, and updating a cluster field and a core field in a vector of a tag array for the line. Other embodiments are described and claimed.

18 Claims, 5 Drawing Sheets

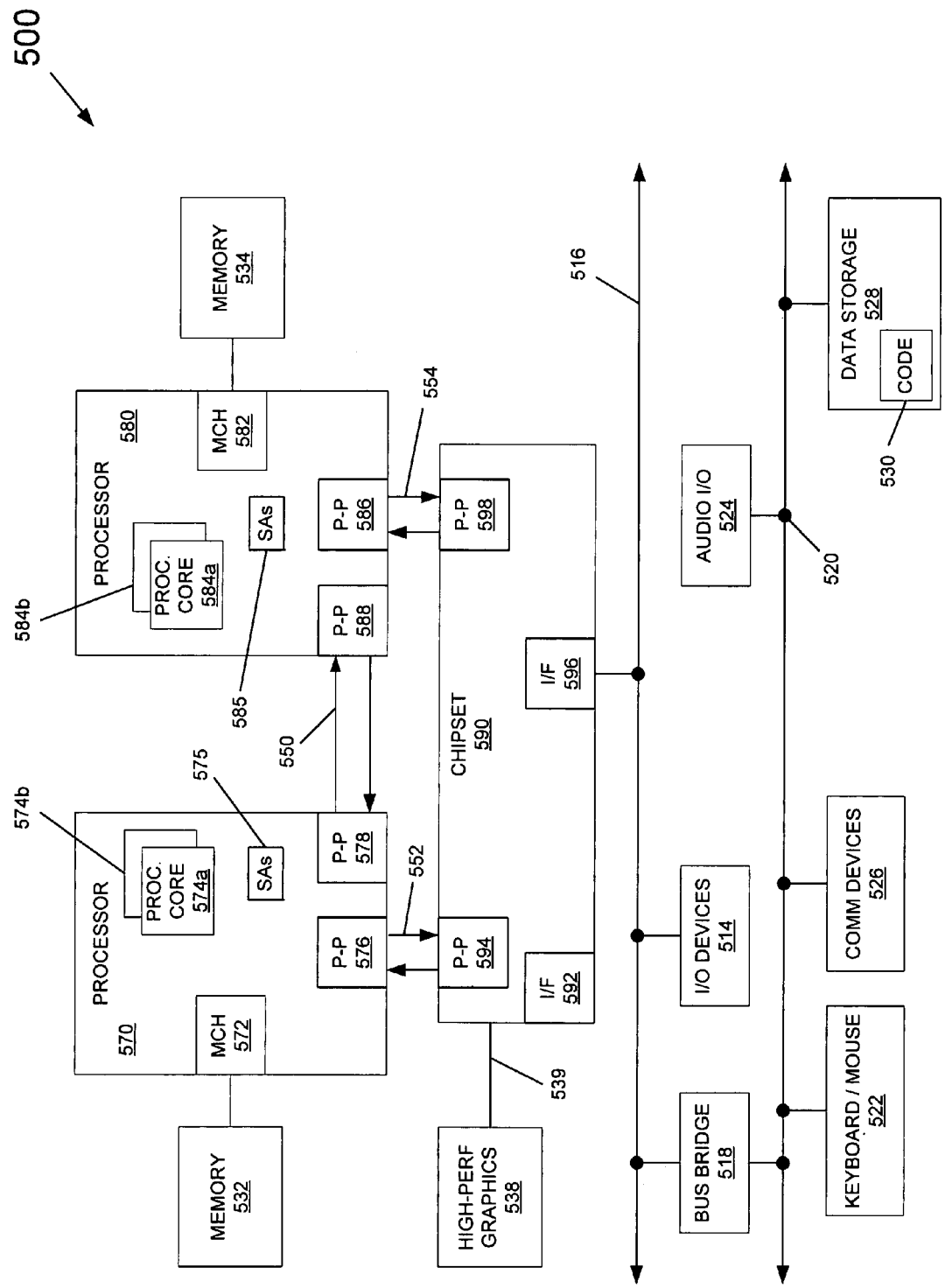

PROVIDING AN INCLUSIVE SHARED CACHE AMONG MULTIPLE CORE-CACHE CLUSTERS

BACKGROUND

Microprocessors generally include a variety of logic circuits fabricated on a single semiconductor integrated circuit (IC). These logic circuits typically include a processor core, memory, and other components. Today's high-end processors include multiple processor cores on the same IC. For instance, multi-core processors such as chip multi-processors (CMPs) feature a multi-core structure that implements multiple processor cores within an IC.

Increased silicon efficiencies are now providing new opportunities for adding additional functionality into the processor silicon. As an example, applications are taking advantage of increased multi-threading capabilities realized from an increased number of processing cores in the same processor. Performance of a multi-core processor may be optimized by mitigating system interconnect latency issues and ensuring that aggregated processor cores appear as one caching agent in order to avoid scalability issues and interconnect saturation. Systems that include caches each associated with multiple cores typically are structured as split caches in which each cache acts as an independent cache domain. This increases the total number of coherence misses, thus increasing the misses per instruction. Split-caches also lose capacity due to replication of shared code/data in all the independent caches.

BRIEF DESCRIPTION OF THE DRAWINGS

FIG. 5 is a block diagram of a multiprocessor system in accordance with an embodiment of the present invention.

DETAILED DESCRIPTION

A scalability agent protocol enables a clustered method of scaling the number of cores in a processor. In a clustered scaling method, a core-cache unit is used as a building block and multiple such units are joined to increase the number of cores in the processor. The core-cache unit can contain two or more cores with an appropriately sized shared cache. In various embodiments, multiple core-cache clusters (referred to herein as "clusters") of a multi-core processor, such as coupled via a system interconnect such as a Common System Interconnect (CSI), may be adapted to provide a socket-wide inclusive cache structure, while individual caches of the clusters may be non-inclusive. The term "core-cache cluster" is generally considered to be a modular unit that comprises one or more cores and a shared cache. Core-cache clusters are used as building blocks for a scalable, multi-core processor.

According to one embodiment of the invention, the "scalability agent protocol" is a communication scheme that enables the aggregating of core-cache clusters operating independently from each other, and provides "graceful" scalability where the responsibility for maintaining memory coherency is approximately shared equally among the core-cache clusters despite any increase or decrease in number, as the scalability agent protocol is partitionable among address regions in the system memory address space. The latencies to the cache in the core-cache cluster substantially remain unchanged as the number of cores increases.

A "scalability agent" is hardware and/or software that manages the flow of outgoing and incoming transactions into a socket associated with the core-cache cluster and supports the scalability agent protocol. According to one embodiment of the invention, the scalability agent (i) aggregates core-cache clusters to appear as one caching agent, (ii) handles local cache coherence between core-cache clusters on the same IC, and (iii) support scalability so that the operations of a core-cache cluster are not significantly effected if other core-cache clusters are added.

Figure 1:
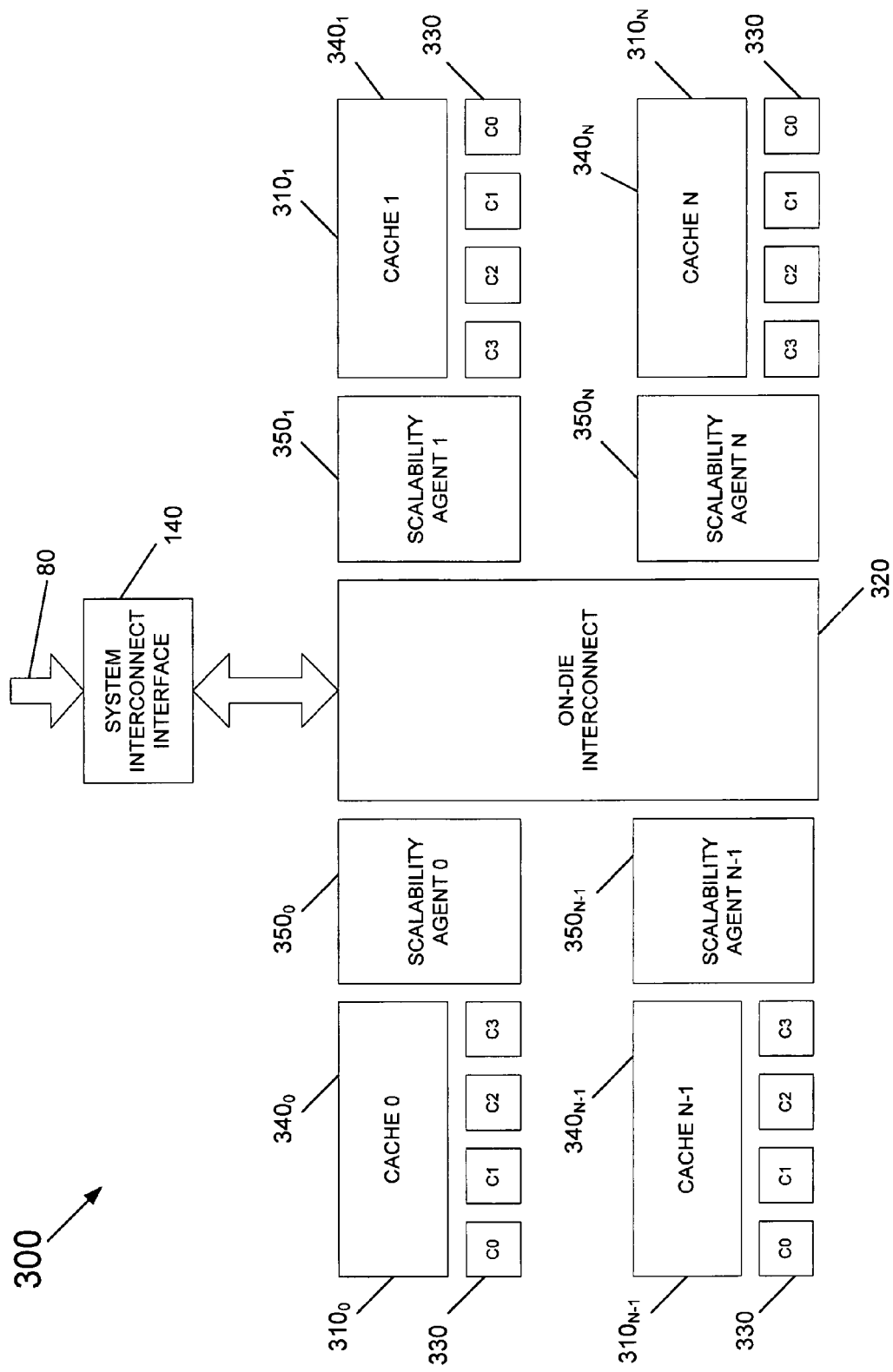
FIG. 1 is a block diagram of a multi-core processor in accordance with one embodiment of the present invention.

Referring now to FIG. 1, an exemplary embodiment of a multi-core processor 300 such as a clustered CMP having a scalability agent is shown. Multi-core processor 300 includes a plurality of core-cache clusters $310_1$-$310_n$ (generically cluster 310) in communication with each other over an on-die interconnect 320. Multi-core processor 300 is in communication with externally located devices over a system interconnect interface 140 and via an interconnect 80. According to one embodiment of the invention, on-die interconnect 320 is configured as a ring interconnect, but may be configured as an interconnect mesh (e.g., 2D mesh). Each core-cache cluster 310 includes one or more cores 330 that share one of a plurality of caches $340_1$-$340_n$ (generically cache 340). The architecture of core-cache clusters 310 may be in accordance with a caching bridge architecture or a distributed shared cache architecture. The transactions involving core-cache clusters 310 are controlled by corresponding scalability agents (SAs) $350_1$-$350_n$ (generically scalability agent 350) as described below. According to this architecture, multi-core processor 300 enables the latency of a first shared cache $340_1$ to remain substantially constant despite increases in the number of cores in processor 300, ensuring that the scalar performance of threads with no or limited sharing remains constant.

A processor in accordance with one embodiment of the present invention can be aggregated to increase its overall performance and support next generation processor designs. For example, if the core-cache cluster is using the caching bridge style architecture, better performance may be realized by aggregating two (4-core) core-cache clusters to produce an eight core (8-core) multi-core processor. Also, two 4-core clusters can be used to build an 8-core processor in one generation, a 12-core processor in the next generation and 16-core processor in a subsequent generation. The appropriate number "N" of core-cache clusters 310 and the number of cores in each core-cache cluster may be determined to achieve optimum performance. This offers flexibility and the option to choose a simpler implementation. In addition to the above mentioned advantages, SAs enable the individual caches to act together as a shared last level cache (LLC), and allows data that is private to each core-cache cluster to stay in its own cache, resulting in lower latency to private data. Thus further shown in FIG. 1, SA units $350_1$-$350_4$ (generically SA units 350) (N=4) uniquely correspond to core-cache clusters 310 and may be address partitioned into independent SA units 350, each of which is responsible for a subset of an address space.

Figure 2:
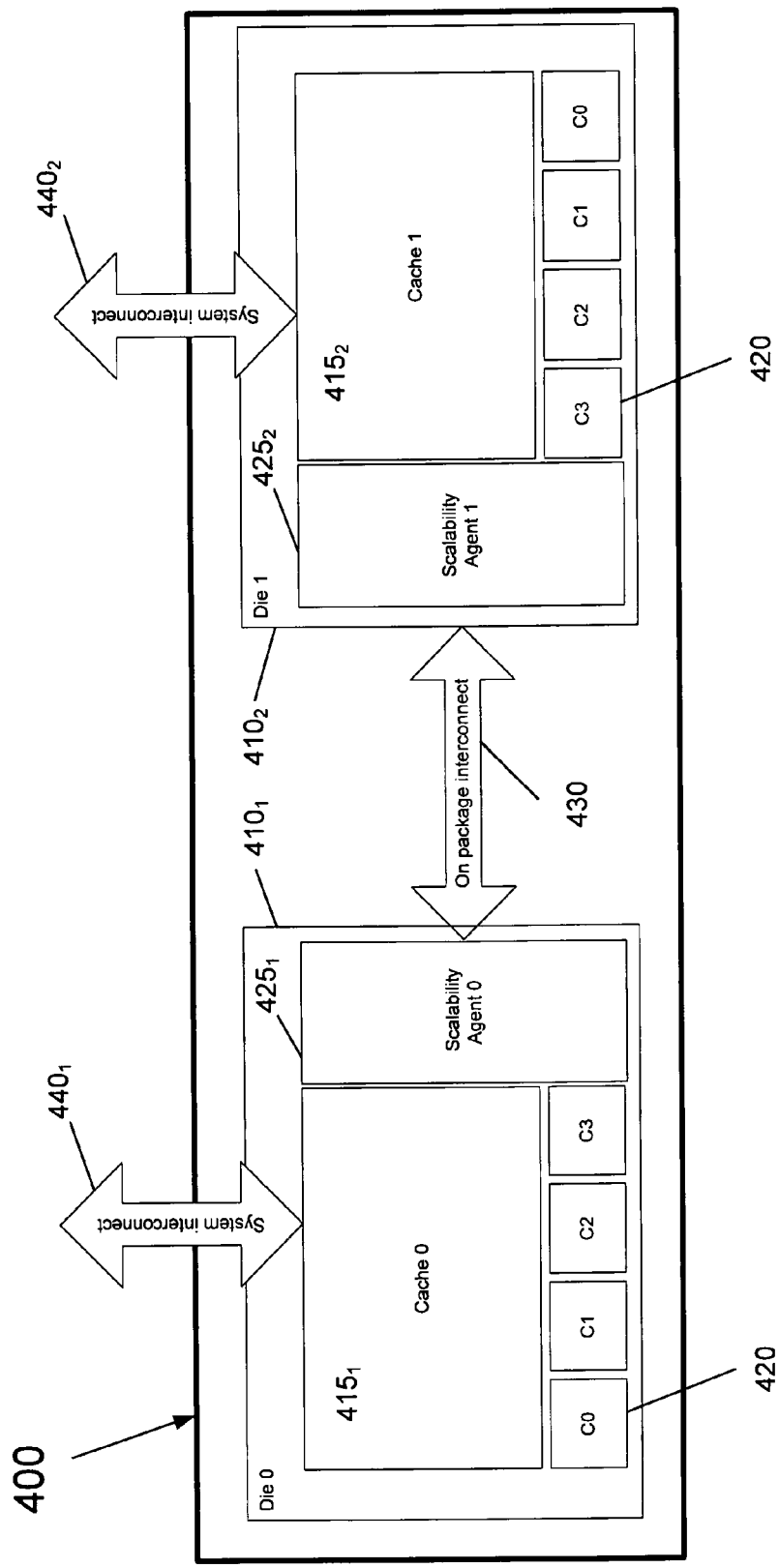
FIG. 2 is a block diagram of a processor in accordance with another embodiment of the present invention.

While shown in the embodiment of FIG. 1 as including a processor formed on a single die, in other embodiments a multi-chip package may be implemented. Referring now to FIG. 2, shown is a block diagram of a processor in accordance with another embodiment of the present invention. As shown in FIG. 2, processor 400, which may be a multi-chip processor package, includes a first die $410_1$ and a second die $410_2$ connected by an on-package interconnect 430, which may be a point-to-point (PTP) interconnect. Each die 410 (generically) may include at least one core-cache cluster including a cache $415_1$ and $415_2$ and a plurality of cores 420. Each die 410 further includes a scalability agent $425_1$ and $425_2$. Processor 400 may communicate with other components of a system using a pair of system interconnects $440_1$ and $440_2$ both of which may be PTP links, in some embodiments. Of course, other implementations are possible. For example, each die may include multiple core-cache clusters and so forth. By implementing the SA on each of the dies, the dies can be joined at the interconnect, thus doubling the number of cores. In addition the caches $415_1$ and $415_2$ will now behave like a shared cache of the size of both, providing a performance improvement. For example, if each die were a 4-core die with 8 megabytes (M) cache, then the combined 8-core processor may behave as a 16M cache.

Based on such configurations, a scalability agent is adapted to support the scalability agent protocol for aggregating core-cache clusters but the aggregation appears as a single caching agent to devices communicatively coupled to a system interconnect. The purpose for shielding the number of core-cache clusters is two-fold. First, the shielding mitigates interconnect saturation issues caused by repetitive traffic over an on-die (or package) interconnect. Second, the shielding avoids repeated reconfiguration of a home agent. More specifically, if each processor core constituted a caching agent, an "N" cluster, "M" socket system would be perceived as a N*M caching agent system to the home agents in the system. The SA essentially functions by assuming the burden of local coherency and distributing coherency responsibilities to the core-cache clusters themselves. Otherwise, each time a core-cache cluster is modified or added, the home agent would need to be re-designed. Besides the shielded aggregation functionality, the scalability agent protocol is designed for handling local coherence between core-cache clusters on the same IC.

In various embodiments, in order to avoid replication that usually happens in a split cache exactly one copy of each line brought into the socket may be maintained. Since there is only copy, it will reside in one of the core-cache cluster's cache. In order to ensure that cache line presence is tracked in all the cores in the socket, a core-bits field may be extended in the core-cache cluster cache. There are two ways of doing this. Each cache can be made to contain core-bits equal to the total number of cores in the socket, or core-bit space can be saved by just remembering which cluster contains the line. Thus each core-cache cluster cache has core bits equal to the number of cores in the local cluster and cluster bits which track whether the line is present in other clusters in the socket.

Figure 3:
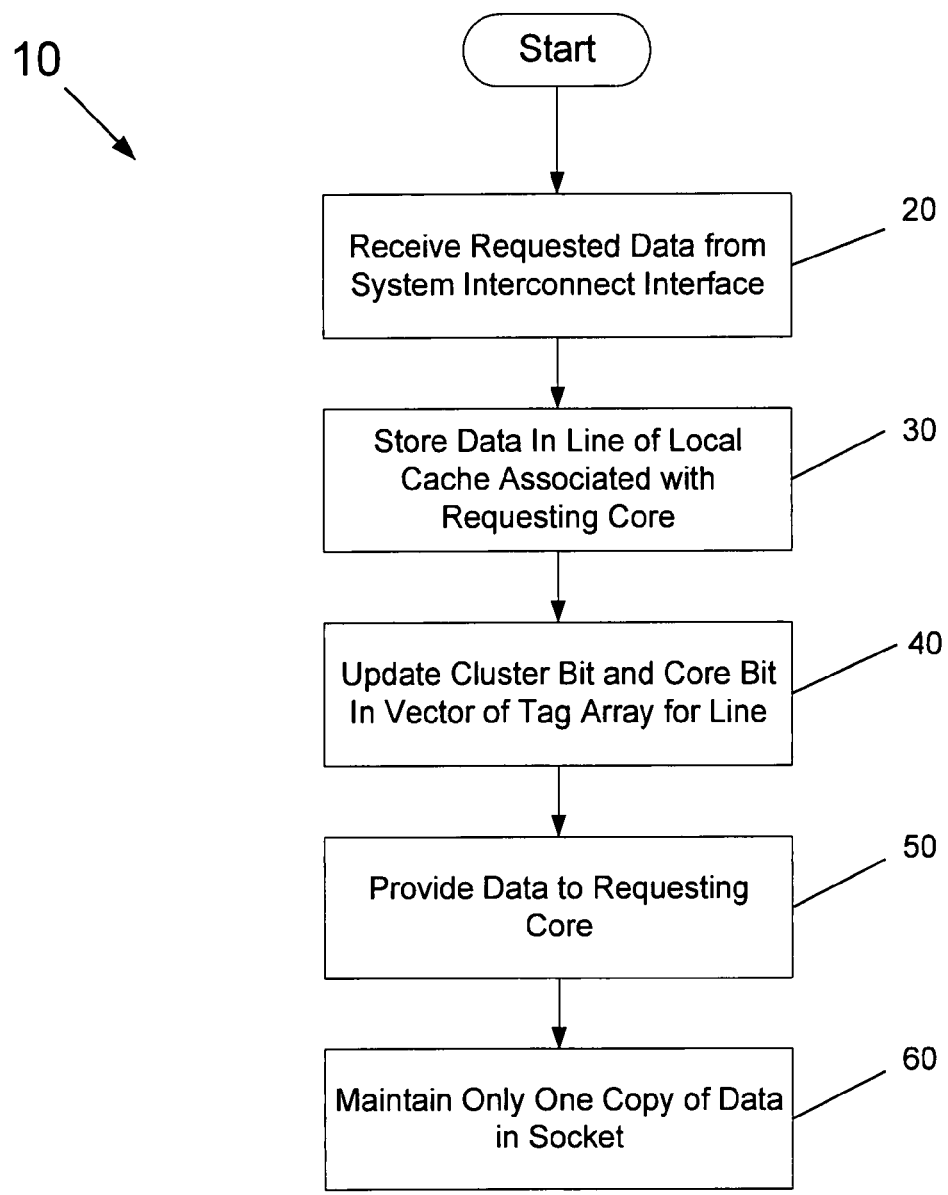
FIG. 3 is a flow diagram of a method in accordance with one embodiment of the present invention.

Referring now to FIG. 3, shown is a flow diagram of a method in accordance of an embodiment of the present invention. As shown in FIG. 3, method 10 may be used to handle incoming data when a cache line is brought into a processor socket. As shown in FIG. 3, method 10 may begin by receiving requested data from a system interconnect interface (block 20). For example, such a cache line may be received by a SA that requested the data. The data then may be stored in a line of a local cache associated with the requesting core (block 30).

Referring still to FIG. 3, next a cluster bit and core bit may be updated in a vector of a tag array for that line (block 40). This updating thus indicates that the line is present in the cluster and has been requested or accessed by the given core. Then the data itself may be provided to the requesting core (block 50). Thus only one copy of the data is maintained in the socket (block 60). That is, only the single line for this data may be present in the socket although it may be accessed by cores of the cluster in which it is stored or cores of other clusters. In order to ensure that cache lines private to each core reside in its own cluster, the policy decision made is to let the first loading access fill the line into its own cluster. Thus lines are distributed without any predetermined address hashing policy. More preference is given to locality over random distribution. Based on this same policy, shared data is randomly distributed based on first access. On the average, shared data will be equidistant from each core in the socket. Since there is only one copy of each line, each cluster is not inclusive on its own. However the socket is inclusive.

For each cache line in the socket, there is a "Owner" cache. This is the cluster cache which contains the line. It contains the line's socket level state and keeps track of the core bits and cluster bits for the line. Cross cluster snoop and incoming flows are designed such that snoop flows eventually snoop cores and clusters indicated by the owner cache. Write back flows from the core are designed such that the write eventually updates the Owner cache. Thus inclusivity is maintained at the socket level.

The information stored in a core-cache cluster tag array is extended to include additional information on the number of clusters in the socket. A Local_Data bit is added to a completion message for each transaction. If the completion message is returning from outside the socket, the bit is forced to be zero. For completion messages returned by the SA, this bit can be either one or zero. When the local_data bit is one, it is an indication to the requester that the line is being returned by an on-die cluster and must not be filled into the requester's cache. If the local_data bit is zero, this implies that the line can be filled into the requester's cache. A Local_Snp bit is defined on the snoop interface between the SA and core cluster. It is used to indicate to the cluster whether the snoop originated because of a transaction generated on the current socket or not. A SNP_all bit is defined on the snoop interface between the SA and core cluster. When set it indicates to the cluster that independent of its cache lookup results all the cores in its cluster must be snooped, except when the cluster is an owner cluster for that line. When not set, the cluster can proceed with the usual rules of inclusive snooping. Cluster bits are indicated to the SA from owner cluster to indicate which clusters must be snooped. These would be indicated on a read which hits a local cache and requires a cross cluster snoop, or a snoop which hits the line in the owner cluster. Cluster bits are indicated on request/responses from core-cache cluster to the SA. A cross snoop (Xsnp_Only) bit is indicated on the interface from core-cache cluster to the SA. When set, the cluster is indicating that it is the owner cluster and a cross cluster snoop is required, but no external request is required for the current request. Cluster bits are always indicated when Xsnp_Only bit is set. A Rd_Miss bit is used to indicate that the current request from core-cache cluster to the SA is a local cache miss. This implies that the SA must not only perform a cross cluster snoop, it may also need to send an external request. A Wr_Miss bit is used to distinguish between evictions and a write back which misses the local cache. When set on a write back transaction, it indicates that the current write back is a write back that missed the local cache. When the Wr_Miss bit is not set, then cluster bits are indicated to the SA. An additional bit, My_own bit, exists on the interface between core-cluster and the SA on a snoop response. When the bit is set, the cluster is indicating to the SA that it is the owner for the line and the cluster bits indicated are valid.

Since the cache in each core-cache cluster is an inclusive shared cache, the cache contains core-bits, which may be present in a vector stored in the cache tag array which indicates which cores in the cluster could possibly contain the current line. Consider that n core-cache clusters may be present with each cluster containing i cores using the SA architecture, the total number of cores in the socket is n*i. The cache in each core-cache cluster will contain a core bits vector which is i bits wide. The core bits vector in each core-cache cluster cache is i+n wide. The first i bits are referred to as local core bits and the next n bits are known as cluster bits. Local core bits indicate which core has accessed the cache. Cluster bits indicate which clusters have the current line.

As will be described below, read/write/snoop flows may be modified to preserve coherence while conforming to the principles described before. The interface between SA and core-cache clusters is designed to assist in the implementation of the above-described policies. In addition, LLC flows are modified to deal with hits which require snoops to other clusters, misses and write backs (WBs) which miss the LLC (they can since the line could be located in a LLC in another cluster). The policies are designed to avoid replication and maintain a single copy of each line in the socket.

Figure 4:
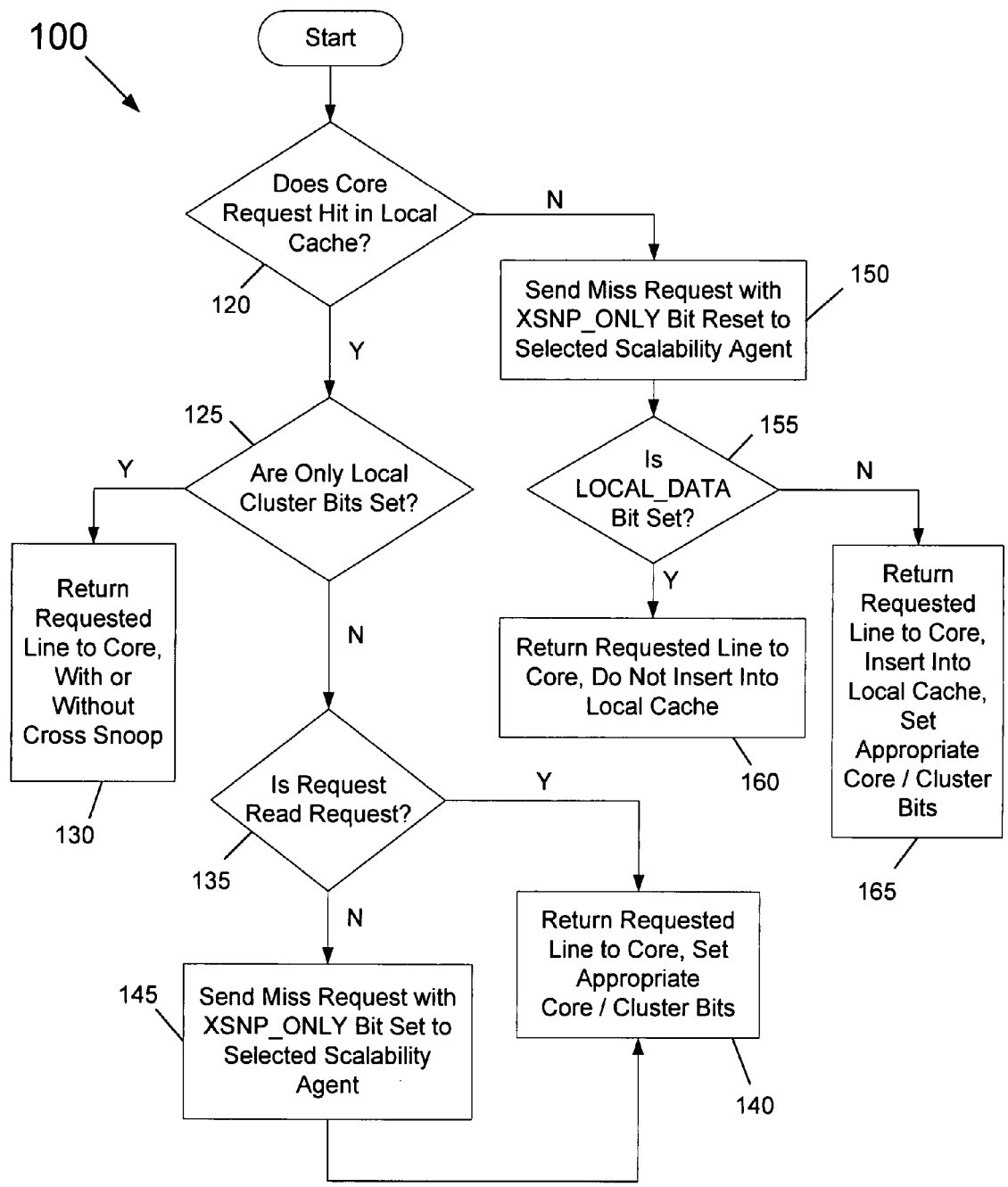
FIG. 4 is a flow diagram of a method in accordance with an embodiment of the present invention.

Referring now to FIG. 4, shown is a flow diagram of a method in accordance with one embodiment of the present invention. More specifically, as shown in FIG. 4 method 100 may be used to illustrate cache management policies for requests that hit in a local cache associated with a requesting core and a miss in such a cache. Referring now to FIG. 4, method 100 may begin by determining whether a core request hits in the local cache (diamond 120). If a request hits the local cache and only the local cluster bits are set (as determined at diamond 125), a local cross snoop could be launched or the line may be returned to the requesting core without cross snoops (block 130). If a local cluster bit is set along with some other cluster bits (or just other bits are set) control passes to diamond 135. If the current request is a read, then the current request is a hit, no request to SA is needed. Thus, appropriate local core and local cluster bits are set before data is delivered to the core (block 140). Otherwise, if the current request is a request for ownership (RFO), then a miss request with xsnp_only bit set is sent to the appropriate SA, which may be based on an address hash (block 145). It is possible that new data may arrive because of the xsnp launched to the other cluster through the SA. Once the xsnp completes, cached data or new data is delivered to the requesting core. Then it is filled into the local cache with just the local cluster bit and the requesting core's local core bit set (again at block 140).

If instead at diamond 120 a miss is determined, the following cache miss policies are followed. A miss request is launched to the SA with the xsnp_only bit reset (block 150). When the SA completes the transaction, it will send a bit called local_data. If local_data bit is set (as determined at diamond 155), then data is delivered to the core and is not filled into the local cache (block 160). If the local_data bit is not set then data is delivered to the core and the line is filled into the local cache, and the local cluster and requesting core's local core bit are set (block 165). Note that the SA uses local_data bit to control replication of data in other caches. While shown with this particular implementation in the embodiment of FIG. 4, the scope of the present invention is not limited in this regard.

From the socket perspective, transactions can be classified into two broad classes: outgoing transactions and incoming transactions. For both classes of transactions, the scalability agent plays the role of an on-die snooping agent and snoop response aggregator. The scalable core-cache cluster aggregation architecture presented by embodiments of the present invention can be used by processors with larger numbers of cores by aggregating core-cache clusters. The on-die snooping functionality of the scalability agents ensures a low latency cache-to-cache transfer between core-cache clusters on the same die. Note that the on-die interconnect latency and bandwidth are non-critical since the traffic from processor cores is filtered through a shared cache.

The following eviction policies may be followed in one embodiment. On a local cache eviction, cluster bits are sent to the SA along with the eviction request (which is a WB message type). In addition the wr_miss bit is set to zero. The following write miss policies are followed. It is possible that a WB from the core will miss the local cache. This is because the line could be residing in another core-cache cluster. When this happens the write is issued to the SA just as an eviction, but the wr_miss bit is set. The following snoop processing policies are followed. When an incoming snoop is received, the snp_all, local_snp bits are examined. When the snp_all bit is set, it indicates that the snoop must be sent to all cores independent of the shared cache results. Note that an owner cache will never receive a snoop with snp_all bit set. If local_snp bit is set and the current snoop hits in the local cache, then appropriate local cores are snooped and respond to the SA with appropriate responses, cluster bits and the my_own bit set. Cluster bits and core bits may be updated appropriately. If local_snp bit is set and the current snoop is a miss, responses may be returned with my_own bit reset. The SA is responsible for performing on-die snooping. In addition to snooping its core-cache cluster as a result of outgoing and incoming requests, it works with the clusters to ensure that there is only a single copy of each line in the socket. It also resolves conflicts between clusters, although the conflict resolution is beyond the scope here, it is assumed that all transactions are conflict free.

Various outgoing transactions having a cluster hit are shown in Table 1, in which SA flows are demonstrated by using two SA units SA0 and SA1 and two core-cache clusters CC0 and CC1, using a modified, exclusive, shared, invalid (MESI) cache coherency policy. Local cross snoops are not shown, only the flows through the SA are described.

TABLE 1

| Transaction type | Local Cache State | Local Core Bits | Other Cluster bits | Other Cluster State | Other Cluster Response |
|---|---|---|---|---|---|
| RdCode/RdData/RdInvlOwn | M, E, S | Only | None | None | None |
| RdCode/RdData | M, E, S | Some | Some | S, I | None |
| RdInvlOwn | M, E | Some | Some | S, I | RspI |
| RdInvlOwn | S | Some | Some | S, I | RspI |
| RdCode/RdData | M, E | None | Just One | I | RspI |

TABLE 1-continued

| Transaction type | Local Cache State | Local Core Bits | Other Cluster bits | Other Cluster State | Other Cluster Response |
|---|---|---|---|---|---|
| RdCode/RdData | M, E | None | Just One | E, S | RspS |
| RdCode/RdData | M, E | None | Just One | M | RspFwdI |
| RdInvlOwn | M, E | None | Just One | E, S, I | RspI |
| RdInvlOwn | M, E | None | Just One | M | RspFwdI |
| RdCode/RdData | S | None | Some/Just One | S, I | None |
| RdCode/RdData | M, E | None | Some | None | None |
| RdInvlOwn | S | None | Some | S, I | RspI |
| RdInvlOwn | M, E | None | Some | S, I | RspI |
| Write | M, E | Just One | None | None | None |

Referring to Table 1, a read/invalidate/own transaction (RdInvlOwn) Hit M, E in CC0, some local cores bits and some other cluster bits are set. This implies that the line can either be S or I in other cores and clusters. The same flow applies when one or more other cluster bits are set, no local cores bits are set and the other cluster cache line state is E/S/I. CC0 will send a miss request to SA0 with the xnp_only bit set to 1 and cluster bits set to 11. CC0 will send a miss request to SA0 with the xnp_only bit set to 1 and cluster bits set to 11. CC1 will miss its cache, but will snoop all its cores and respond with RspI and my_copy set to zero. SA0 receives an invalidate response (RspI) from CC1 with my_copy set to 0. It will send a complete GntE_Cmp to CC0 with local_data set to zero. Since local_data is set and this is a hit request, data is delivered to core and the cluster bit is reset for CC1 in cache.

Referring still to Table 1, assume the RdInvlOwn transaction hits S. Some or none of the local core bits are set, one or more other cluster bits are set. This is essentially a socket miss and the socket miss request is sent after cleaning the socket state. CC0 will send a miss request to SA0 with the xnp_only bit set to 0 and cluster bits set to 01. SA0 examines cluster bits and sends a snoop to CC1 with local_snp set and snp_all set to 1. CC1 will miss its cache, but will snoop all its cores and respond with RspI and my_copy set to zero. SA0 receives the RspI from CC1 with my_copy set to 0. It will then send a source broadcast on a system interconnect. Eventually home logic will send a completion to the requesting cluster. Since local_data is set to zero and this is a miss request, data is delivered to core and the line is filled into Cache0. Cluster bits are initialized to 10 and appropriate cores bits are set.

Referring to Table 1, a read code/data transaction (RdCode/RdData) hits M, E in CC0. Only just one other cluster bit is set. The line state is I in the other cluster. CC0 will send a miss request to SA0 with the xnp_only bit set to 1 and cluster bits set to 01. SA0 examines cluster bits and sends a snoop to CC1 with local_snp set and snp_all set to 1. CC1 will miss its cache, but will snoop all its cores and respond with RspI and my_copy set to zero. SA0 receives the RspI from CC1 with my_copy set to 0. It will send a complete GntE_Cmp to CC0 with local_data set to zero. Since local_data is set and this is a hit request, data is delivered to core and the cluster bit is reset for CC1 in cache.

Referring to Table 1, a RdCode/RdData transaction hits M, E in CC0. Only just one other cluster bit is set. The line state is E,S in the other cluster. CC0 will send a miss request to SA0 with the xnp_only bit set to 1 and cluster bits set to 11. SA0 examines cluster bits and sends a snoop to CC1 with local_snp set and snp_all set to 1. CC1 will miss its cache, but will snoop all its cores and respond with RspS and my_copy set to zero. SA0 receives the RspS from CC1 with my_copy set to 0. It will send a complete GntS_Cmp to CC0 with local_data set to zero. Since local_data and this is a hit request, data is delivered to core and the local cluster and local core bits are set for the line.

Referring to Table 1, a RdCode/RdData/RdInvlOwn transaction hits M, E in CC0. Only just one other cluster bit is set. The line state is M in the other cluster. CC0 will send a miss request to SA0 with the xnp_only bit set to 1 and cluster bits set to 01. SA0 examines cluster bits and sends a snoop to CC1 with local_snp set and snp_all set to 1. CC1 will miss its cache, but will snoop all its cores and respond with RspFwdI and my_copy set to zero. SA0 receives the RspFwdI from CC1 with my_copy set to 0. It will send a complete GntE_Cmp to CC0 with local_data set to zero. Since local_data and this is a hit request, data is delivered to core and the local cluster bit and appropriate local core bit set for the line.

Shown in Table 2 below are examples of outgoing transactions on a cluster miss in accordance with one embodiment of the present invention.

TABLE 2

| Transaction type | Remote Cache State | Remote Cache Core Bits | Remote Cache Other Cluster bits | Other Cluster State | Other Cluster Response |
|---|---|---|---|---|---|
| RdCode/RdData/RdInvlOwn | I | None | None | None | None |
| RdCode/RdData | M, E, S | Only | None | None | None |
| RdInvlOwn | M, E | Only | None | None | None |
| RdInvlOwn | S | Only | None | None | None |
| RdCode/RdData | M, E | None | Just One | I | RspI |
| RdCode/RdData | M, E | None | Just One | E, S | RspS |
| RdCode/RdData | M, E | None | Just One | M | RspFwdI |
| RdInvlOwn | S | None | Just One | S, I | RspI |
| RdInvlOwn | M, E | None | Just One | E, S, I | RspI |
| RdInvlOwn | M, E | None | Just One | M | RspFwdI |

TABLE 2-continued

| Transaction type | Remote Cache State | Remote Cache Core Bits | Remote Cache Other Cluster bits | Other Cluster State | Other Cluster Response |
|---|---|---|---|---|---|
| RdCode/RdData | M, E, S | None | Some | S, I | RspS |
| RdInvlOwn | S | None | Some | S, I | RspI |
| RdInvlOwn | M, E | None | Some | S, I | RspI |
| RdCode/RdData | M, E, S | Some | Some | S, I | RspI/RspS |
| RdInvlOwn | S | Some | Some | S, I | RspI |
| RdInvlOwn | M, E | Some | Some | S, I | RspI |
| Write Miss | M, E | None | Just One | None | None |
| Cache Eviction | M | Just One | Just One | None | None |

Referring to Table 2, assume a Local Cluster Miss and a Remote Cluster Miss. In this case an external transaction is required. CC0 will send a miss request to SA0 with the xnp_only bit set to 0 and the rd_miss bit set. When rd_miss is set cluster bits are irrelevant, SA0 examines cluster bits and sends a snoop to CC1 with local_snp set and snp_all set to 0. CC1 will miss its cache, since snp_all is set 0. It will not snoop its core but return a RspI to the SA with my_copy set to zero. SA0 receives the RspI from CC1 with my_copy set to 0. This implies that CC1 did not have the line. It will then send a source broadcast on the system interconnect. Eventually home logic will send a complete to the requesting cluster. Since local_data is set to zero and this is a miss request, data is delivered to core and the line is filled into Cache0. Cluster bits are initialized to 10 and appropriate cores bits are set.

Referring to Table 2, a RdCode/Rd Data Local Cluster has a Miss and the Remote Cluster M/E/S with only its local core bits set and no other cluster bits set. CC0 will send a miss request to SA0 with the xnp_only bit set to 0 and the rd_miss bit set. SA0 examines cluster bits and sends a snoop to CC1 with local_snp set and snp_all set to 0. CC1 will hit in its cache. It will examine its local core bits and complete appropriate processing. Then it will respond with RspFwdS to SA0 and send data directly to requester. The cluster bit of CC0 is set in CC1. Along with the RspFwdS, my_copy bit is set and cluster bits are shipped to SA0. SA0 receives the RspFwdS along with my_copy set. It examines cluster bits from CC1 and decides if it needs to snoop the requesting/other clusters. In this case, no further snoops are needed. It sends a Cmp to CC0 with local_data set to 1. CC0 will examine local_data is set, it will deliver data to the requesting core and will not fill it into its cache.

Referring still to Table 2, a RdInvlOwn transaction misses in the Local Cluster, Remote Cluster M/E with only its local core bits set and no other cluster bits set. CC0 will send a miss request to SA0 with the xnp_only bit set to 0 and the rd_miss bit set. SA0 examines cluster bits and sends a snoop to CC1 with local_snp set and snp_all set to 0. CC1 will hit in its cache, it will examine its local core bits and complete appropriate processing. Then it will respond with RspFwdI to SA0 and send data directly to requester. The cluster bit of CC0 is set in CC1. Along with the RspFwdI, my_copy bit is set and cluster bits are shipped to SA0. SA0 receives the RspFwdI along with my_copy set. It examines cluster bits from CC1 and decides if it needs to snoop the requesting/other clusters. In this case, no further snoops are needed. It sends a Cmp to CC0 with local_data set to 1. CC0 will examine local_data is set, it will deliver data to the requesting core and will not fill it into its cache.

Referring still to Table 2, a RdInvlOwn transaction has a Local Cluster Miss, Remote Cluster S with only its local core bits set and no other cluster bits set. CC0 will send a miss request to SA0 with the xnp_only bit set to 0 and the rd_miss bit is set. SA0 examines cluster bits and sends a snoop to CC1 with local_snp set and snp_all set to 0. CC1 will hit in its cache, it will examine its local core bits and complete appropriate processing. In this case the line is invalidated. Then it will respond with RspI to SA0. Along with the RspI, my_copy bit is set and cluster bits are shipped to SA0. SA0 receives the RspI along with my_copy set. It examines cluster bits from CC1 and decides if it needs to snoop the requesting/other clusters. In this case, no further snoops are needed. Since the line is invalid in the socket, it sends a miss for a source broadcast. Eventually the system domain will deliver data to CC0. local_data is not set. CC0 will examine local_data is set, it will deliver data to the requesting core and fill the line into its cache. Appropriate core bit and local cluster bits are set.

Referring still to Table 2, on RdCode/RdData Local Cluster Miss, Remote Cluster M/E with no local core bits set occurs. Only requesting cluster's cluster bit is set. RspI/RspS. This is a special case which requires what can be described as cleanup snoop. In the first phase, since SA does not know which cluster is the owner, it sends a snoop to all clusters with the snp_all bit reset. Only one cluster will hit the snoop (the owner cluster) and rest will all miss. Owner cluster will send back a snoop response with cluster bits for the line and the my_own bit is set on response. When the SA receives cluster bits, it issues snoops again with the snp_all bit set for all the cluster for which the cluster bit is set. This snoop is the cleanup snoops which cleans all cluster which may contain the line. One the cleanup snoop is completed. a complete is indicated to the requesting cluster. CC0 will send a miss request to SA0 with the xnp_only bit set to 0 and. The rd_miss bit is set. When rd_miss is set cluster bits are irrelevant. SA0 examines cluster bits and sends a snoop to CC1 with local-_snp set and snp_all set to 0. CC1 will hit in its cache it will examine its local core bits and complete appropriate processing. It will respond with RspFwdI to SA0. Data is shipped to the requester with a Data_E. In addition cluster bit of the requester is set (in this case it is already set). Along with the response, my_copy bit is set and the original cluster bits are shipped to SA0. SA0 receives the RspFwdI along with my_copy set. It examines cluster bits from CC1 and decides if it needs to snoop the requesting cluster. A snoop is issued to requesting cluster with the snoop all bit set. CC0 will complete the snoop and will send a RspI/RspS SA0. SA0 then sends a Cmp to CC0. CC0 now can use the data without filling into its local cache.

Referring still to Table 2, assume RdData/RdInvlOwn Local Cluster Miss, Remote Cluster M/E with no local core bits set. Only requesting cluster's cluster bit is set. Another core in the requesting cluster contains the line in M state. RspFwdI. The forwarding core sends the data directly to the requesting cluster (its own cluster). Its local cluster sends a RspFwdI to SA. In this case SA receives two RspFwdI's. The requesting cluster will receive data twice and it must discard the data from the home. Modified data is delivered to the requesting core if the request is RdInvlOwn type. If the original request is a RdData, then local cluster delivers the data to the requesting core in E state and initiates a Wr_Miss flow for the current line. CC0 will send a miss request to SA0 with the xnp_only bit set to 0 and the rd_miss bit set. SA0 examines cluster bits and sends a snoop to CC1 with local_snp set and snp_all set to 0. CC1 will hit in its cache, it will examine its local core bits and complete appropriate processing. In this case the line is demoted to S state. Then it will respond with RspFwdI to SA0. Data is shipped to the requester with a Data_E. In addition cluster bit of the requester is set. Along with the response, my_own bit is set and the original cluster bits are shipped to SA0. SA0 receives the RspFwdI along with my_own set. It examines cluster bits from CC1 and decides if it needs to snoop the requesting cluster. A snoop is issued to requesting cluster with the snoop all bit set. The snoop will complete and send a RspFwdI to SA0. Data is sent from the M core to core-cache cluster logic. This data will override the data returned from CC1. Data is now M state. CC0 initiates wr miss flow and return the data to the requester in E state. It will not fill it in its cache.

Referring still to Table 2, assume RdInvlOwn whose socket state is S. It is a miss in the local cluster and the owner cache state indicates shared state. Basically the line is cleaned up in the socket and an external request is sent. CC0 will send a miss request to SA0 with the xnp_only bit set to 0 and the rd_miss bit set. SA0 examines cluster bits and sends a snoop to CC1 with local_snp set and snp_all set to 0. CC1 will hit in its cache, it will examine its local core bits and complete appropriate processing. It will respond with RspI to SA0 and invalidate its local copy. Along with the response, my_own bit is set and the original cluster bits are shipped to SA0. SA0 receives the RspI along with my_own set. It examines cluster bits from CC1 and decides if it needs to snoop the requesting cluster. A snoop is issued to requesting cluster with the snoop all bit set. CC0 will complete the snoop and will send a RspI to SA0. SA0 then sends a source broadcast on CSI with RdInvlOwn. Eventually the system interconnect will send a DataC_E_Cmp to CC0. This line is filled into CC0 cache and delivered to the requesting core.

Referring still to Table 2, assume a write back from core which misses the local cache. SA will send a no operation (nop) snoop first. This snoop will not have any effect on the cache state. Based on responses SA can determine which cluster is the owner cluster. CC0 will send a write miss request to SA0 with the wr_miss bit set to 1 and SA0 sends cluster bits and sends a Nop snoop to CC1 with local_snp set and snp_all set to 0. CC1 will hit in its cache. Since it is a hit but is a nop, no changes are made to cache state. However a RspI is sent with my_own bit set. SA0 will now send a data_pull snoop to the requesting cluster with the id for the owner cluster. CC0 will then send a writeback to the owner cluster. Once receiving a complete from the owner cluster, it sends a de-allocate to SA.

Referring still to Table 2, an eviction from a cluster cache can occur. Since evictions can only happen from owner cache, the cluster bits are sent to SA. SA performs appropriate cleanup of other cluster caches and the eviction is then sent out to the system memory. CC0 will send a write request to SA0 with the wr_miss bit set to 0 and cluster bits are indicated. SA0 sends snoops to all clusters for which cluster bits are indicated. Local_snp is set and snp_all is set. CC1 responds to the snoop with a RspI and my_own bit is reset. Once all responses are received, data_pull is indicated to the requesting cluster. Requesting cluster can now send the WbMtoI directly to the external system. Eventually transaction is completed in the CSI domain and deallocate is sent to SA.

Referring still to Table 2, incoming snoop transactions end up performing the two snoop steps. First the request snoop is performed then the cleanup snoop is performed. Incoming snoops gets allocated into SA0. SA0 sends snoops to all clusters with local_snp set to zero and snp_all is set to zero. Owner cluster will respond with a RspFwdI and my_own bit is set. In this case it is CC0. CC1 sends a RspI. SA0 sends a combined RspFwdI to home for the incoming snoops. It then sends a data pull message to CC0 (owner cluster). CC0 on receipt of the data pull message sends the data message to the requester of the original snoop.

Embodiments may be suited for CMP platforms to reduce traffic between the CMPs. As shown in FIG. 5, multiprocessor system 500 is a point-to-point interconnect system, and includes a first processor 570 and a second processor 580 coupled via a point-to-point interconnect 550, although the system may be of another bus architecture. As shown in FIG. 5, each of processors 570 and 580 may be multi-core processors including first and second processor cores (i.e., processor cores 574a and 574b and processor cores 584a and 584b), although other cores may be present. Furthermore, as shown in FIG. 5 SA 575 and 585, which may be an aggregation of individual SAs for each processor, may be coupled to each pair of processor cores 574a and 574b and 584a and 584b, respectively, to handle memory traffic in accordance with an embodiment of the present invention. Still referring to FIG. 5, first processor 570 further includes a memory controller hub (MCH) 572 and point-to-point (P-P) interfaces 576 and 578. Similarly, second processor 580 includes a MCH 582 and P-P interfaces 586 and 588. As shown in FIG. 5, MCH's 572 and 582 couple the processors to respective memories, namely a memory 532 and a memory 534, which may be portions of main memory (e.g., dynamic random access memory (DRAM)).

First processor 570 and second processor 580 may be coupled to a chipset 590 via P-P interconnects 552 and 554, respectively. As shown in FIG. 5, chipset 590 includes P-P interfaces 594 and 598. Furthermore, chipset 590 includes an interface 592 to couple chipset 590 with a high performance graphics engine 538. In one embodiment, an Advanced Graphics Port (AGP) bus 539 or a point-to-point interconnect may be used to couple graphics engine 538 to chipset 590. As shown in FIG. 5, various I/O devices 514 may be coupled to first bus 516, along with a bus bridge 518 which couples first bus 516 to a second bus 520. Various devices may be coupled to second bus 520 including, for example, a keyboard/mouse 522, communication devices 526 and a data storage unit 528 which may include code 530, in one embodiment. Further, an audio I/O 524 may be coupled to second bus 520.

While the present invention has been described with respect to a limited number of embodiments, those skilled in the art will appreciate numerous modifications and variations therefrom. It is intended that the appended claims cover all such modifications and variations as fall within the true spirit and scope of this present invention.

What is claimed is:

1. A method comprising:
   receiving requested data from a system interconnect interface in a first scalability agent (SA) of a multi-core processor including a plurality of core-cache clusters;
   storing the requested data in a line of a local cache of a first core-cache cluster including a requestor core; and updating a cluster field and a core field in a vector of a tag array for the line to indicate that the requested data is present in the local cache line and has been requested or accessed by the requestor core, the cluster field having a plurality of bits each corresponding to one of the plurality of core-cache clusters and the core field having a plurality of bits each corresponding to a core of the first core-cache cluster.

2. The method of claim 1, further comprising providing the requested data to the requestor core.

3. The method of claim 2, further comprising maintaining the requested data only in the line of the local cache.

4. The method of claim 1, further comprising receiving in the first scalability agent a request from a second core-cache cluster for the requested data with a cross snoop indicator having a first state.

5. The method of claim 4, further comprising providing the requested data to the requestor core of the second core-cache cluster in a reply transaction and not storing the requested data in a local cache of the second core-cache cluster if a local data indicator associated with the reply transaction is of a first state.

6. The method of claim 4, further comprising providing the requested data to the requestor core of the second core-cache cluster in a reply transaction and storing the requested data in a local cache of the second core-cache cluster if a local data indicator associated with the reply transaction is of a second state.

7. The method of claim 1, further comprising providing the requested data from the line to the first core-cache cluster directly from the local cache responsive to a read request without accessing the first SA if the vector indicates that any cores of the first core-cache cluster has accessed the requested data.

8. The method of claim 1, wherein updating the cluster field and the core field comprises setting a cluster bit and a core bit associated with the first core-cache cluster and the requestor core in the vector.

9. An apparatus comprising:
a processor socket including a first die and a second die, the processor socket including:
a plurality of core-cache clusters each including a cache memory and one or more processor cores in communication with the cache memory, wherein the cache memory of each core-cache cluster is non-inclusive and the aggregation of the cache memories of all of the core-cache clusters is inclusive such that only a single copy of data is to be present in the aggregation of the cache memories of the processor socket;
a plurality of scalability agents each coupled to one of the plurality of core-cache clusters, wherein each of the scalability agents is to operate in accordance with a protocol to ensure that the plurality of core-cache clusters appear as a single caching agent; and
an interconnect to couple a first scalability agent of the first die with a second scalability agent of the second die.

10. The apparatus of claim 9, wherein the aggregation of the cache memories together form a shared cache memory between the first and second dies.

11. The apparatus of claim 9, wherein the plurality of scalability agents are to provide a first load access of data to the cache memory of the core-cache cluster that requested the data.

12. The apparatus of claim 9, wherein the cache memory includes a tag array to store vectors, wherein each vector includes a first field to store a cluster bit for each core-cache cluster to indicate which core-cache cluster includes a corresponding cache line and a second field to store a core bit for each core of the corresponding core-cache cluster to indicate which core requested or accessed the corresponding cache line.

13. The apparatus of claim 12, wherein each core-cache cluster has a cluster number associated therewith.

14. A system comprising:
a first processor including a first plurality of core-cache clusters each including a first cache memory, first processor cores in communication with the first cache memory, and a first scalability agent (SA), wherein the first cache memory of each core-cache cluster is non-inclusive and the aggregation of the first cache memories of all of the first plurality of core-cache clusters is inclusive such that only a single copy of data is to be present in the aggregation of the first cache memories;
a second processor including a second plurality of core-cache clusters each including a second cache memory, second processor cores in communication with the second cache memory, and a second SA, wherein the second cache memory of each core-cache cluster is non-inclusive and the aggregation of the second cache memories of all of the second plurality of core-cache clusters is inclusive such that only a single copy of data is to be present in the aggregation of the second cache memories;
a point-to-point (PTP) interconnect to couple the first processor to the second processor; and
a dynamic random access memory (DRAM) coupled to the first processor.

15. The system of claim 14, wherein the first SA is to maintain the data only in a line of a corresponding first cache memory after a request for the data from a different one of the first plurality of core-cache clusters.

16. The system of claim 14, wherein the aggregation of the first cache memories together form a shared cache memory for the first processor.

17. The system of claim 14, wherein the first cache memory includes a tag array to store vectors, each including a first field to store a cluster bit for each of the first plurality of core-cache clusters to indicate which of the first plurality of core-cache clusters includes a corresponding cache line and a second field to store a core bit for each core of the corresponding one of the first plurality of core-cache clusters to indicate which core requested or accessed the corresponding cache line.

18. The system of claim 17, wherein each one of the first plurality of core-cache clusters has a cluster number associated therewith to be stored in the cluster bit of the tag array.

* * * * *